United States Patent [19]

Boberski et al.

[11] Patent Number: 4,617,331
[45] Date of Patent: Oct. 14, 1986

[54] WATER-DISPERSIBLE POLYMERS CONTAINING METAL CHELATING GROUPS

[75] Inventors: William G. Boberski, Gibsonia; Richard M. Nugent, Allison Park; Jeffrey G. Koren, Butler, all of Pa.

[73] Assignee: PPG Industries, Inc., Pittsburgh, Pa.

[21] Appl. No.: 750,840

[22] Filed: Jul. 1, 1985

Related U.S. Application Data

[63] Continuation of Ser. No. 542,880, Oct. 17, 1983, abandoned.

[51] Int. Cl.$^4$ .......................... C09D 5/44; C09D 3/58; C09D 3/64; C09D 3/72
[52] U.S. Cl. ................... 523/420; 204/181.7; 524/901
[58] Field of Search .......... 204/181 C, 181.7; 523/420; 524/901

[56] References Cited

U.S. PATENT DOCUMENTS

| | | | |
|---|---|---|---|
| 3,607,834 | 9/1971 | Marx et al. | 524/357 |
| 3,984,299 | 10/1976 | Jerabek | 204/181 C |
| 4,016,141 | 4/1977 | Ritz et al. | 528/125 |
| 4,115,226 | 9/1978 | Zwack et al. | 204/181 C |
| 4,210,506 | 7/1980 | Hoppe et al. | 204/181 C |
| 4,358,551 | 11/1982 | Shimp | 204/181 C |
| 4,419,468 | 12/1983 | Lucas | 204/181 C |
| 4,443,569 | 4/1984 | Schröder et al. | 523/414 |

OTHER PUBLICATIONS

Handbook of Chemistry and Physics, 33rd edition, Chemical Rubber Publishing Co., Cleveland, Ohio, 1951, pp. 510, 511, 598 and 599.
Chemical Abstracts, vol. 88, No. 14, Apr. 3, 1978, Abstract 88:90461v.
Chemical Abstracts, vol. 89, No. 24, Dec. 11, 1978, Abstract 89:204262j.
Chemical Abstracts, vol. 92, No. 4, Jan. 28, 1980, Abstract 92:23084u.
Chemical Abstracts, vol. 92, No. 14, Apr. 7, 1980, Abstract 92:112580v.
Chemical Abstracts, vol. 95, No. 8, Aug. 24, 1981, Abstract 95:63829j.
Chemical Abstracts, vol. 95, No. 18, Nov. 2, 1981, Abstract 95:151413z.
Chemical Abstracts, Tenth Collective Index, Chemical Substances, Tyrosine-Z, pp. 55762cs & 55763cs.

*Primary Examiner*—Ronald W. Griffin
*Attorney, Agent, or Firm*—Godfried R. Akorli

[57] ABSTRACT

There is herein provided an aqueous dispersion of a resinous composition which is water-solubilized with a metal compound such as a metal salt, an example of which is zinc acetate.

14 Claims, No Drawings

WATER-DISPERSIBLE POLYMERS CONTAINING METAL CHELATING GROUPS

This is a continuation of application Ser. No. 542,880, filed Oct. 17, 1983, now abandoned.

BACKGROUND OF THE INVENTION

1. Field of the Invention

The present invention relates to a non-gelled aqueous composition containing a polymer comprising a plurality of amino groups and a water-solubilizing group comprising a metal compound. Further, the present invention encompasses methods of preparing and using a coating composition comprising the non-gelled aqueous composition.

2. Brief Description of the Prior Art

Water-based polymer systems, aptly depicted by contrasting them with solvent-based polymer systems, are known in the art. For an organic polymer to be water-soluble, it generally contains polar groups with a strong affinity for water. Illustrative examples of the polar groups are ether, carboxyl, hydroxyl, amine or amide and ionized carboxyl or amino groups, or precursors thereof.

In providing the water-solubilizing group to the polymer, an acid and/or amine is typically incorporated therein, and then neutralized. The resultant salt effects solubilization.

It has been found that the nature of the water-solubilizing group can be determinative of the solution and film properties of the resultant coatings. Hence, work has continued in developing water-solubilizing groups that will provide stable resinous compositions which are capable of producing films of desirable properties. In this regard, the present invention provides a non-gelled aqueous composition containing a water-solubilizing group which comprises a metal compound.

SUMMARY OF THE INVENTION

In accordance with the foregoing, the present invention encompasses a non-gelled aqueous composition comprising:

(A) a polymer containing a plurality of amino groups, and (B) a water-solubilizing group containing a metal compound.

The polymer is preferably an epoxy polymer, an acrylic polymer or a polyamine polymer. A specific example of the polymers preferred herein is polyglycidyl ether of polyphenol which is reacted with diketimine of triethylene tetraamine. This polymer can be admixed with a metal compound such as zinc acetate in an amount sufficient to effect the solubilization of the polymer in water. In the practice of this invention, the aqueous compositions have been employed as coating compositions, particularly electrocoating compositions, that form films of excellent properties. In some embodiments of the invention, films formed from the coatings of this invention which contain a curing agent cure at relatively lower temperatures of, say, 325° F. In some other embodiments of the invention, films formed from the coating can self-cure.

DETAILED DESCRIPTION OF THE INVENTION

As described herein, the non-gelled aqueous composition is a polymer matrix comprising a polymer containing a plurality of amino groups and a metal compound. It is believed that the polymer matrix is a complex or chelate of the metal compound and the polymer.

By a plurality of amino groups herein is meant that there is present in the polymer in question more than one basic amino group and that there are sufficient number of basic amino groups present to coact with the metal compound so as to effect the solubilization of the polymer. As aforestated, it is believed that the coaction between the amino groups of the polymer and the metal compound is a complex- or chelate-forming reaction. The valences of the metal are at least partially satisfied by complex or chelate formation. It is believed that, in accordance with this invention, the valances of the metal are satisfied with amino groups from the same molecules of the polymer. It is believed that there is, in effect, an intramolecular bonding of the polymers with the metal compound through the amino groups.

The polymer containing the plurality of amino groups, in a specific embodiment, is illustrated by a polyepoxide polymer such as polyglycidyl ether of polyphenol which is reacted with diketimine of triethylene tetraamine. The preparation of this polymer is known in the art, however, there is provided hereinbelow a brief description of a convenient method of the preparation. In this preparation, the terminal amino groups of the triethylene tetraamine are reacted with a blocking agent, such as carbonyl compound, e.g., methyl isobutyl ketone to form a diketimine. The diketimine is reacted with an epoxy resin such as diglycidyl ether of bisphenol A over a temperature range of about 65°–110° C. During the reaction, it is believed that the ketimine groups remain blocked, leaving reactive secondary amino groups. The secondary amino groups react with the epoxy resin, thus providing a chain-extended epoxy resin containing a plurality of amino groups.

In general, the epoxy resin useful herein has more than one epoxy group per molecule. Examples of the epoxy resins are found in the *Handbook of Epoxy Resins*, Lee and Neville, 1967, McGraw-Hill Book Company.

Another example of the polymers containing a plurality of amino groups is that which is derived from the free radical addition polymerization of an ethylenically unsaturated monomer containing an amino group such as a primary, secondary or tertiary amino group. Non-limiting examples of the amino group-containing monomers are dimethylaminoethyl (meth)acrylate and dimethylaminopropyl (meth)acrylate. The monomer can be homopolymerized or copolymerized with other monomers so as to form the acrylic polymer. Alternately, the acrylic polymer can be formed with a monomer which can be post-reacted with an amine. For example, an epoxy-containing acrylic polymer can be reacted with amine via the epoxy group.

Other polymers containing a plurality of amino groups which can be used herein are represented by the general formula:

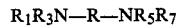

$$R_1R_3N-R-NR_5R_7$$

wherein $R_1$, $R_3$, $R_5$ and $R_7$, each independently, is hydrogen or an organic radical such as alkyl, alkenyl, or aryl group. The organic radical may, optionally, contain subtituents. R is an organic radical as aforestated which typically contains amino group(s).

The metal compound useful herein is, preferably, an acid salt of a metal which is polyvalent and preferably divalent. An illustrative example is an acid salt of a metal such as zinc, copper, bismuth, lead, or chromium. The metal compound is employed in an amount sufficient to effect the solubilization of the polymer. For example, the metal is employed in an amount ranging from 1 to 150 grams of metal per 1000 grams of total resin solids. Preferably, the metal is employed in an amount ranging from about 25 to 60 grams per 1000 grams of total resin solids. In preparing the aqueous composition of this invention, the polymer containing a plurality of amino groups is blended with the metal compound, usually, in the presence of a surfactant. In a specific method of preparation, zinc acetate can be admixed with a surfactant and water and heated to a temperature of about 50° C. The resultant mixture can be admixed with the polymer containing a plurality of amino groups. The resultant reaction can be continued until a homogeneous mixture is obtained or until no more polymer appears to be taken into solution. The resultant composition can be thinned with water to form an aqueous dispersion having acceptable properties that will make it useful in a coating composition. The term "dispersion" as used herein is intended to cover solutions and colloidal compositions, as well. In this context, the term "water-solubilizing group" is to be understood as meaning that the solubilizing group renders the polymer in question compatible with water. The term "water-solubilizing group" encompasses metal compounds other than those specified herein. Hence, metal compounds having properties in accordance with this invention are encompassed, as well.

A coating composition formulated with the aqueous dispersion may contain a coalescing solvent for effecting improved film appearance. These solvents include hydrocarbons, alcohols, esters, ethers and ketones. In addition, other coating additives such as a pigment composition, a surfactant or a wetting agent may also be included in the coating composition.

The aqueous composition of this invention is particularly useful for electrodeposition. When the aqueous composition described above is employed for use in electrodeposition, it is placed in contact with an electrically conductive anode and an electrically conductive cathode with the surface to be coated being the cathode. Following contact with the aqueous composition, an adherent film of the coating composition is deposited on the cathode when sufficient voltage is impressed between the electrodes. The conditions under which electrodeposition is carried out are known. The aqueous compositions of this invention can also be used as conventional coatings in applications such as flow, dip, spray and roll coating. After the coating has been applied, it is usually cured by baking at elevated temperatures. Usually, temperatures of about 350° to 450° F. are employed. Higher temperatures of about 500° to 600° F. can be employed but are not desirable.

Notably, it is a distinct feature of the invention that the coating can be heated to a relatively low temperature of about 325° F. to effect cure. Additionally, it is a feature of the invention that relatively higher amounts of metals can be introduced into the coating compositions and deposited on substrates. Art-known methods of introducing relatively higher amounts of metals and depositing same generally affects adversely the composition or film properties.

It is also a feature of the invention that in certain embodiments, the coating described herein can self-cure upon baking. Illustratively, the coating, solubilized with acetate of zinc, mercury, chromium, cobalt, nickel or iron, self-cures. However, it may be desirable to employ a curing agent. When used with a curing agent, it is desirable that the film-forming vehicle of the coating composition comprise active hydrogen groups which are reactive at elevated temperatures with the curing agent. Examples of the active hydrogen groups are hydroxyl, thiol, primary amine, secondary amine (including imine) and carboxyl groups.

The curing agents are those which are capable of reacting with the active hydrogens to form a cross-linked product. Examples of suitable curing agents are phenolic resins, aminoplasts and polyisocyanates. The polyisocyanates should be capped or blocked so that they will not prematurely react with the active hydrogens.

Suitable aminoplasts for use in the invention are described in U.S. Pat. No. 3,937,679 to Bosso et al in column 16, line 3, continuing to column 17, line 47, the portions of which are hereby incorporated by reference. As disclosed in the aforementioned portions of the '679 patent, the aminoplast can be used in combination with methylol phenol ethers. The aminoplast curing agent usually constitutes about 1-60 and preferably 5-40 percent by weight of the resinous composition based on total weight of the acid-solubilized resinous vehicle and the aminoplast.

With regard to the capped or blocked polyisocyanate curing agents, these are described in U.S. Pat. No. 4,104,147, column 7, line 36, continuing to column 8, line 37, the portions of which are herey incorporated by reference. Sufficient capped or blocked polyisocyanate is present in the coating system such that the equivalent ratio of latent isocyanate groups to active hydrogens is at least 0.1:1 and preferably about 0.3 to 1:1. This and other aspects of the invention are further illustrated below.

These examples and others listed in the specification are not to be construed as limiting the invention as to scope or details, unless otherwise indicated. All parts and percentages in the examples, as well as the specification, are by weight, unless otherwise indicated.

EXAMPLE 1

This example illustrates the instant water-dispersed composition of matter comprising a resin which was chain extended with triethylene tetraamine and a water-solubilizing group which is zinc acetate. The chain-extended resin was prepared, using the following:

| Ingredients | Parts by Weight (grams) | Non-Volatiles | Equivalents |
| --- | --- | --- | --- |
| EPON 828[1] | 643 | 643 | 3.42 |
| Bisphenol A | 161.8 | 161.8 | 1.42 |
| Xylene | 39 | — | — |
| Benzyldimethylamine (catalyst) | 2.0 | — | — |
| A polyurethane curing agent[2] | 1002.6 | 701.8 | — |
| Diketimine of triethylene tetraamine[3] (chain extender) | 232 | 165.6 | 1.0 (2N) |
| Methylethanolamine | 63.8 | 63.8 | 0.85 |
| ARMEEN 2C[4] | 18.5 | 18.5 | 0.05 |

| Ingredients | Parts by Weight (grams) | Non-Volatiles | Equivalents |
|---|---|---|---|
| Methyl isobutyl ketone | 174.6 | — | — |

[1] Epoxy resin, made by reacting epichlorohydrin and bisphenol A, having an epoxy equivalent of 188, and commercially available from Shell Chemical Company.
[2] It is formed by half-capping toluene diisocyanate (80/20 isomer mixture) with 2-ethylhexanol and reacting the resultant product with trimethylolpropane in a 3:1 molar ratio. It is present as a 70 percent solids solution in a 90/10 mixture of methyl isobutyl ketone and n-butanol.
[3] Triethylene tetraamine having the terminal amines reacted and thus blocked with methyl isobutyl ketone (70% solids in methyl isobutyl ketone) to form ketimines.
[4] Dicocoamine, commercially available from Armak Chemicals.

The EPON 828, bisphenol A and xylene were charged to a properly equipped reaction vessel, stirred and heated to a temperature of 150° C. in a nitrogen atmosphere. Thereafter, the benzyldimethylamine was added to the resultant mixture which was heated to about 219° C. to reflux and held for 30 minutes and then cooled to 110° C. The epoxy equivalent of a sample of the reaction mixture was measured and found to be equal to 444. The polyurethane curing agent and the diketimine derivative were added over a temperature range of 110°-65° C. to the reaction mixture which was then held for 10 minutes. Thereafter, the methylethanolamine was added to the reaction mixture which was heated to 110° C. and held for 2 hours at this temperature. The ARMEEN 2C was added to the reaction mixture which was then held for another hour at 110° C. The resultant composition had a Gardner-Holdt viscosity of R-S as measured for 50:50 mixture of the resin and DOWANOL PM (available from Dow Chemical Company). The resultant composition comprising the chain-extended resin was thinned with the methyl isobutyl ketone, discharged and stored.

An aqueous dispersion of the above resinous composition was prepared by solubilizing it with zinc acetate. The preparation was as follows:

| Ingredients | Parts by Weight (grams) | Non-Volatiles | Equivalents |
|---|---|---|---|
| The above resinous composition | 900 | 675 | 1.12 |
| Zinc acetate | 64.7 | 19.3 | — |
| Deionized water | 426.8 | — | — |
| Surfactant mix[1] | 10.7 | 6.8 | — |

[1] It was prepared by blending 120 parts by weight of alkylimidazoline (commercially available from Geigy Industrial Chemicals as GEIGY AMINE C), 120 parts by weight of acetylenic alcohol (commercially available from Air Products and Chemicals as SURFYNOL 104), and 120 parts by weight of 2-butoxyethanol, 221 parts by weight of deionized water and 19 parts by weight of glacial acetic acid.

The zinc acetate, surfactant and water were mixed and heated to 50° C. The resultant mixture was admixed with the resinous composition to produce a resin solids content of 50 percent based on the total weight of the composition. By adding 2152.2 grams of water directly to the resinuous composition, there was obtained an aqueous dispersion which had a solids content of 20 percent and acceptable properties that will make it useful in coating compositions.

A cationic paint was prepared using the above aqueous dispersion and other ingredients, as listed below.

| Ingredients | Parts by Weight (grams) | Resin Solids | Pigment Solids |
|---|---|---|---|
| An aqueous resinous composition | 1526.3 | 319.0 | — |
| (as afore-described) (20.9%) | | | |
| Deionized water | 329.6 | — | — |
| GN-2529-6 Pigment paste[1] | 129.6 | 12.6 | 66.6 |
| Dibutyltin oxide paste[2] (catalyst) | 14.4 | 1.7 | — |

[1] It was prepared with titanium dioxide and carbon black pigments which were thoroughly ground in water, using an organic grinding vehicle as described in U.S. Pat. No. 4,186,124.
[2] The paste comprised a resinous material which was the same as that used in preparing the pigment paste.

The above ingredients were mixed thoroughly to produce a cationic paint that had acceptable properties making it useful in coating compositions.

The cationic paint having a pigment-to-binder ratio of the composition of 0.2, a solids content of 20 percent based on total weight of the composition, pH of 7.0 and conductivity of 2450 mhos/cm. was introduced into an electrodeposition bath. After a 40 percent ultrafiltration and an addition of 5 percent DOWANOL PPH (the percentage is based on the total resin solids), metal substrates were electrocoated in the bath. At a bath temperature of 80° F. (27° C.) and electrode potential of 40 volts, a metal substrate was electrocoated for 2 minutes to produce films of 0.6 mil thickness. The coated substrates were baked at 360° F. (182° C.) for 20 minutes to produce continuous films which were hard, in that 100 acetone double rubs did not attack the films.

Metal substrates of bare steel, oily bare steel and zinc phosphated steel, coated as afore-stated, displayed a good corrosion resistance Property after a 14-day exposure in a salt spray chamber at 100° F. (38° C.) at 100 percent by weight relative humidity in an atmosphere of 5 percent aqueous sodium chloride.

EXAMPLE 2

This example illustrates the instant water-dispersed composition of matter comprising a resin which was chain extended with triethylenetetraamine and a water-solubilizing group which is manganese sulfate. The chain-extended resin was prepared in essentially the same manner as disclosed in Example 1.

| Ingredients | Parts by Weight grams | Non-Volatiles | Equivalents |
|---|---|---|---|
| EPON 828 | 564 | 564 | 3 |
| Bisphenol A | 114 | 114 | 1 |
| Xylene | 34.4 | — | — |
| Benzyldimethylamine (catalyst) | 1.3 | — | — |
| A polyurethane curing agent as in Example 1 | 870 | 609.0 | — |
| Diketimine of triethylenetetraamine (chain extender, as in Example 1) | 222 | 155.5 | 1.0 (2N) |
| Methylethanolamine | 64.5 | 64.5 | 0.86 |
| ARMEEN 2C | 15.5 | 15.5 | 0.04 |
| 2-Butoxyethanol | 651.8 | — | — |

An aqueous dispersion of the above resinous composition was prepared by solubilizing it with manganese sulfate, in essentially the same manner as described in Example 1.

| Ingredients | Parts by Weight grams | Non-Volatiles | Equivalents |
| --- | --- | --- | --- |
| The above resinous composition | 87.5 | 52.5 | 0.100 |
| Manganese sulfate (MnSO$_4$.H$_2$O) | 8.4 | 2.8 | — |
| Deionized water | 60.1 | — | — |

The resultant aqueous dispersion had a solids content of 35.5 percent and acceptable properties that make it useful in coating compositions. Draw-down coating of the aqueous dispersion on bare steel panels was prepared using a 3-mil bar. The resultant film was flashed (air-dried) at room temperature and then baked at 360° F. (182° C.) for 20 minutes. The baked film was hard in that it took 36 acetone double-rubs to remove it.

EXAMPLE 3

This example illustrates the instant water-dispersed composition of matter comprising the resinous composition of Example 2 which was water-solubilized in essentially the same manner as described in Example 1, using cadmium acetate. The solubilization was as follows:

| Ingredients | Parts by Weight grams | Non-Volatiles | Equivalent |
| --- | --- | --- | --- |
| The above resinous composition | 87.5 | 52.5 | 0.100 |
| Cadmium acetate [Cd(Oac)$_2$2H$_2$O] | 6.7 | 2.8 | — |
| Deionized water | 63.8 | — | — |

The resultant aqueous dispersion had a solids content of 35.5 percent and acceptable properties that make it useful in coating compositions. Draw-down coating of the aqueous dispersion on bare steel panels was prepared using a 3-mil bar. The resultant film was flashed (air-dried) at room temperature and then baked at 360 F. (182° C.) for 20 minutes. The baked film was hard in that it was not softened by 100 acetone double-rubs.

EXAMPLE 4

This example illustrates the instant water-dispersed composition of matter comprising the resinous composition of Example 2 which was water-solubilized in essentially the same manner as described in Example 1, using herein as the water-solubilizing group, cupric acetate.

| Ingredients | Parts by Weight grams | Non-Volatiles | Equivalents |
| --- | --- | --- | --- |
| The resinous composition of Example 2 | 87.5 | 52.5 | 0.100 |
| Cupric acetate [Cu(OAc)$_2$H$_2$O] | 5.0 | 1.6 | — |
| Deionized water | 123.9 | — | — |

The aqueous dispersion had a solids content of 25 percent and properties that make it useful as a coating composition. Draw-down coating of the aqueous dispersion on bare steel panels was prepared using a 3-mil bar. The resultant film was flashed (air-dried) at room temperature and then baked at 360° F. (182° C.) for 20 minutes. The baked film was hard in that it took 36 acetone double-rubs to remove it.

ADDITIONAL EXAMPLES

The following examples further illustrate the use of metal salt in water-solubilizing resinous compositions and further illustrate that a water-solubilized resinous composition in accordance with this invention can self-cure.

The resinous composition which was employed here was notably without a curing agent. The following were used in the preparation:

| Ingredients | Parts by Weight grams | Non-Volatiles | Equivalents |
| --- | --- | --- | --- |
| EPON 828 | 905.8 | 905.8 | 4.82 |
| Bisphenol A | 207.3 | 207.3 | 1.82 |
| Xylene | 55.8 | — | — |
| Benzyldimethylamine (catalyst) | 2.7 | — | — |
| 2-Butoxyethanol | 495.6 | — | — |
| Diketimine of triethylene tetraamine as in Example 1 | 333 | 249.8 | 1.5(2N) |
| Methylethanolamine | 96 | 96 | 1.28 |
| ARMEEN 2C | 28.0 | 28.0 | 0.07 |

The EPON 828, bisphenol A and xylene were charged to a properly equipped reaction vessel and heated to 150° C. with stirring under a nitrogen blanket. The benzyldimethylamine was then introduced into the reaction vessel which was heated until the reaction mixture began to reflux. At 222° C., the reaction mixture was held for 30 minutes and then cooled to 150° C. The epoxy equivalent of a sample of the reaction mixture was measured and found to be equal to 393. The 2-butoxyethanol was added to the reaction mixture which was then cooled to 80° C. and the diketimine and methylethanolamine were added thereto. The reaction mixture was held for 2 hours at 110° C. and the ARMEEN 2C was added thereto. The resultant mixture was held for one hour, cooled, discharged and stored.

The resultant mixture comprising the resinous composition having a solids content of 69.6 percent was water-solubilized with metal salts and employed as coatings, as follows.

EXAMPLE 5

This example illustrates the instant water-dispersed composition of matter comprising the above resinous composition which was water-solubilized in essentially the same manner as described in Example 1, using zinc acetate.

| Ingredients | Parts by Weight grams | Non-Volatiles | Equivalents |
| --- | --- | --- | --- |
| The above resinous composition | 48.8 | 34.2 | 0.100 |
| Zinc acetate [Zn(OAc)$_2$.2H$_2$O] | 5.5 | 1.64 | 0.05 |
| Deionized water | 46.7 | — | — |

The resultant aqueous dispersion had a solids content of 35.5 percent and excellent properties that make it useful in coating compositions. The aqueous dispersion was drawn down on a bare steel substrate with a 3-mil bar and baked for 40 minutes at 365° F. (185° C.). The baked coating was hard in that 100 acetone double-rubs did not soften the coating.

EXAMPLE 6

This example illustrates the instant water-dispersed composition of matter comprising the above resinous composition which was water-solubilized in essentially the same manner as described in Example 1, using iron acetate.

| Ingredients | Parts by Weight grams | Non-Volatiles | Equivalents |
|---|---|---|---|
| The above resinous composition | 48.8 | 34.2 | 0.100 |
| Iron acetate [Fe(OAc)$_2$.2H$_2$O] | 4.35 | 1.4 | 0.05 |
| Deionized water | 124.9 | — | — |

The resultant aqueous dispersion had a solids content of 35.5 percent and good properties that make it useful in coating compositions. The aqueous dispersion was drawn down on a bare steel substrate with a 3-mil bar and baked for 40 minutes at 365° F. (185° C.). The baked coating was hard in that 100 acetone double-rubs did not soften the coating.

EXAMPLE 7

This example illustrates the instant water-dispersed composition of matter comprising the above resinous composition which was water-solubilized in essentially the same manner as described in Example 1, using acetate of mercury.

| Ingredients | Parts by Weight grams | Non-Volatiles | Equivalents |
|---|---|---|---|
| The above resinous composition | 48.8 | 34.2 | 0.100 |
| Acetate of mercury [Hg(OAc)$_2$] | 8.0 | 5.0 | 0.05 |
| Deionized water | 53.6 | — | — |

The resultant aqueous dispersion had a solids content of 35.5 percent and fair properties that make it useful in coating compositions. The aqueous dispersion was drawn down on a bare steel substrate with a 3-mil bar and baked for 40 minutes at 365° F. (185° C.). The baked coating was relatively hard in that 70 acetone double-rubs were needed to remove the coating.

EXAMPLE 8

This example illustrates the instant water-dispersed composition of matter comprising the above resinous composition which was water-solubilized in essentially the same manner as described in Example 1, using acetate of chromium.

| Ingredients | Parts by Weight grams | Non-Volatiles | Equivalents |
|---|---|---|---|
| The above resinous composition | 48.8 | 34.2 | 0.100 |
| Acetate of chromium [Cr(OAc)$_3$.H$_2$O] | 6.2 | 1.3 | 0.075 |
| Deionized water | 45.0 | — | — |

The resultant aqueous dispersion had a solids content of 35.5 percent and good properties that make it useful in coating compositions. The aqueous dispersion was drawn down on a bare steel substrate with a 3-mil bar and baked for 40 minutes at 365° F. (185° C.). The baked coating was hard in that 100 acetone double-rubs did not soften the coating.

EXAMPLE 9

This example illustrates the instant water-dispersed composition of matter comprising the above resinous composition which was water-solubilized in essentially the same manner as described in Example 1, using acetate of cobalt.

| Ingredients | Parts by Weight grams | Non-Volatiles | Equivalents |
|---|---|---|---|
| The above resinous composition | 48.8 | 34.2 | 0.100 |
| Acetate of cobalt [Co(OAc)$_2$.4H$_2$O] | 6.2 | 1.5 | 0.05 |
| Deionized water | 47.0 | — | — |

The resultant aqueous dispersion had a solids content of 35.5 percent and good properties that make it useful in coating compositions. The aqueous dispersion was drawn down on a bare steel substrate with a 3-mil bar and baked for 40 minutes at 365° F. (185° C.). The baked coating was hard in that 100 acetone double rubs did not soften the coating.

EXAMPLE 10

This example illustrates the instant water-dispersed composition of matter comprising the above resinous composition which was water-solubilized in essentially the same manner as described in Example 1, using acetate of nickel.

| Ingredients | Parts by Weight grams | Non-Volatiles | Equivalents |
|---|---|---|---|
| The above resinous composition | 48.8 | 34.2 | 0.100 |
| Acetate of nickel [Ni(OAc)$_2$.4H$_2$O] | 6.2 | 1.5 | 0.05 |
| Deionized water | 47.0 | — | — |

The resultant aqueous dispersion had a solids content of 35.5 percent and good properties that make it useful in coating compositions. The aqueous dispersion was drawn down on a bare steel substrate with a 3-mil bar and baked for 40 minutes at 365° F. (185° C.). The baked coating was hard in that 100 acetone double rubs did not soften the coating.

Therefore, what is claimed is:

1. A non-gelled aqueous composition comprising:
   (A) a polymer containing a plurality of amino groups, and
   (B) a water-solubilizing group containing a metal compound.

2. A composition of claim 1, wherein the polymer is an epoxy polymer, an acrylic polymer, a polyamine polymer, a polyether polymer, a polyester polymer, a polyurea polymer, a polyurethane polymer, or an alkyd polymer.

3. A composition of claim 2, wherein the epoxy polymer is a polyglycidyl ether of polyphenol which is reacted with diketimine of triethylene tetraamine.

4. A composition of claim 1, wherein the metal compound is of a divalent metal.

5. A composition of claim 1, wherein the metal compound contains zinc, copper, bismuth, lead, chromium, cadmium, iron, mercury, nickel or cobalt.

6. A composition of claim 1, wherein the metal is present in an amount ranging from 1 to 150 grams per 1000 grams of total resin solids.

7. A composition of claim 6, wherein the metal is present in an amount ranging from 25 to 60 grams per 1000 grams of total resin solids.

8. A composition of claim 1, wherein the metal compound is an acid salt of a metal which is zinc, copper, bismuth, lead, chromium, cadmium, iron, mercury, nickel or cobalt.

9. A composition of claim 8, wherein the metal compound is zinc acetate.

10. A process for preparing a water-dispersed composition which comprises reacting a metal compound with a polymer containing a plurality of amino groups; the metal compound is reacted in an amount ranging from 1 to 150 grams of metal per 1000 grams of total resin solids.

11. A process of claim 10, wherein the metal compound contains zinc, copper, bismuth, lead, chromium, cadmium, iron, mercury, nickel or cobalt.

12. A method of preparing a decorative or protective coating comprising applying on a substrate a coating composition comprising the composition of claim 1.

13. A method of claim 12 which comprises electrocoating an electrically conductive surface serving as a cathode in an electrical circuit comprising said cathode, an anode and an aqueous dispersion of an electrodepositable composition comprising the composition of:
(A) a polymer containing a plurality of amino groups, and
(B) a water-solubilizing group containing a metal compound.

14. An article of matter which is prepared by the method of claim 13.

* * * * *